April 21, 1953 W. W. SCHROEDER 2,636,063
ELECTRICAL BATTERY
Filed May 8, 1950 2 SHEETS—SHEET 1
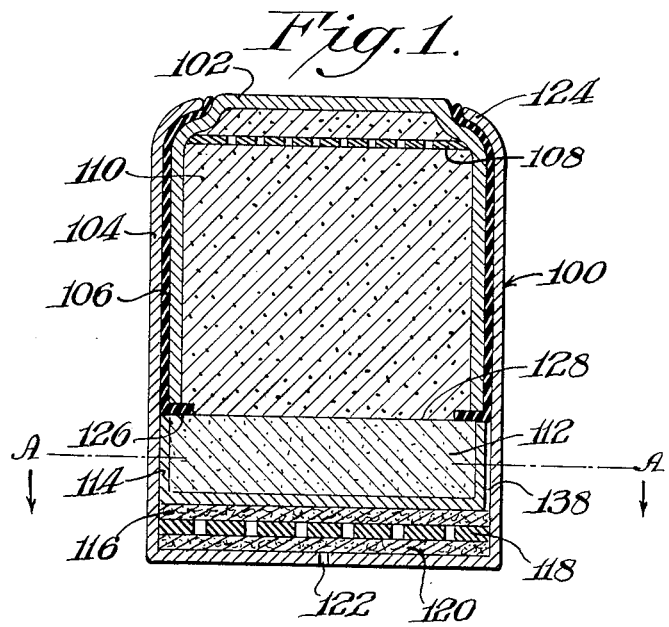
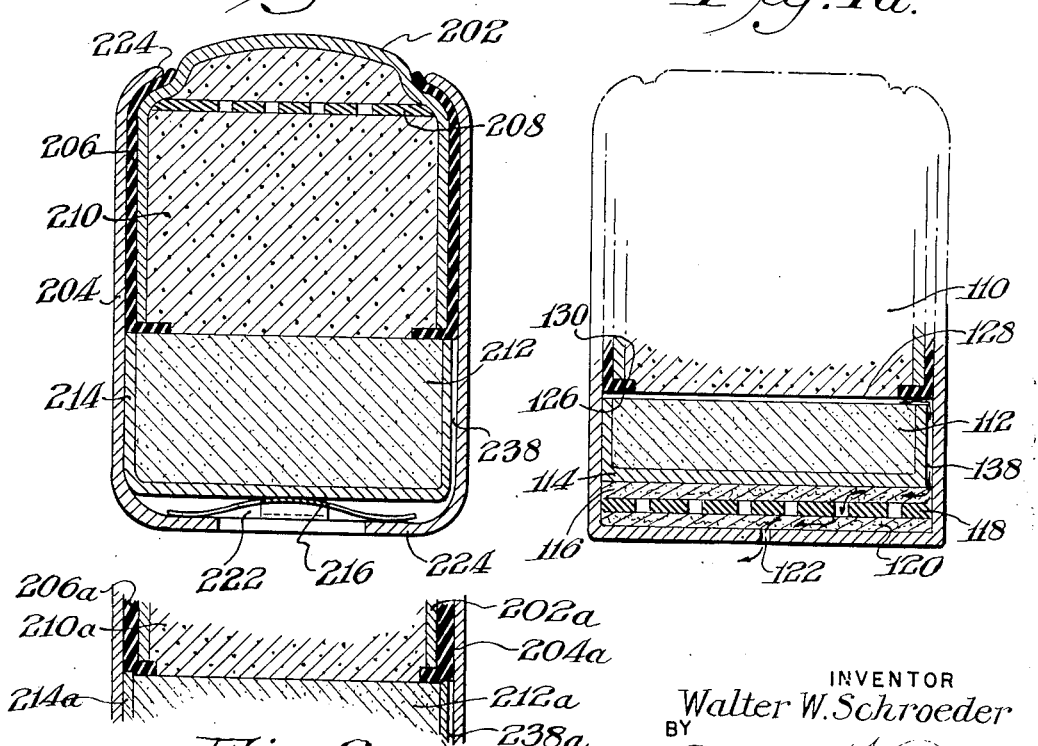
INVENTOR
Walter W. Schroeder
BY
ATTORNEY April 21, 1953 W. W. SCHROEDER 2,636,063
ELECTRICAL BATTERY
Filed May 8, 1950 2 SHEETS—SHEET 2

INVENTOR
Walter W. Schroeder
BY
ATTORNEY

Patented Apr. 21, 1953

2,636,063

UNITED STATES PATENT OFFICE 2,636,063

ELECTRICAL BATTERY

Walter W. Schroeder, North Adams, Mass., assignor to Sprague Electric Company, North Adams, Mass., a corporation of Massachusetts Application May 8, 1950, Serial No. 160,659

10 Claims. (Cl. 136—133)

The present invention relates to electric batteries, and more particularly relates to batteries encased in metal housings.

The evolution of hydrogen and other gases during discharge, shelf and re-charging of batteries is a common occurrence. This gassing action is a distinct problem in the case of small cells which are more or less permanently encased, for use in hearing aid devices, etc. It is difficult to provide a vent for gas release which will not also permit leakage of liquid components of the cell system.

If the gases are permitted to build up a high internal pressure within such cells, the cell container may rupture and corrosive electrolytes may be discharged to damage surrounding structures.

As an example, primary cells containing highly effective mercuric oxide depolarizers which are reduced to mercury during cell operation, are in high demand for such applications as hearing aid power supplies. For this reason all precaution must be taken to eliminate any hazard which they may represent to the human body and to the remainder of the hearing aid circuit. There is always present the danger that cells of this type may leak electrolyte and/or liquid mercury formed during cell operation. If the cell is so sealed as to safeguard against mercury and electrolyte leakage, then there is danger that excess gas pressure may develop within the cell by the generation of polarizing gases. Such excess gas pressure may rupture the cell container and allow electrolyte to discharge from the cell. Discharge of electrolyte and/or mercury into a hearing aid may cause irreparable damage to the very intricate and expensive hearing aid circuit elements surrounding the cell.

The history of what has been done to obliterate this ever present danger is evidence of the failure thus far met in seeking a solution to the current problem. In most applications where it has been found necessary to provide venting means to relieve excess gas pressures within the cell, such means have consisted of an emergency vent such as a closed crack or split in the wall of the cell container, formed by slitting the wall and then stamping the metal together again to close the slit. Another crude prior art ventilating means is a groove that does not completely penetrate the container wall. The venting operation is similar when either of these means is employed, should gas pressure develop within the cell the vent supposedly opens up sufficiently to permit the escape of gas. While both of these means provide a substantially sealed unit under normal operating conditions, the venting is not too satisfactory. In many cases, especially when the container wall consists of a readily amalgamable material such as copper, escaping mercury will amalgamate with the copper at the site of the slit or groove, and permanently seal the container wall against the relief of gas pressure except by major rupture. If the cell is to be recharged, the problem becomes even more pronounced.

It is an object of this invention to overcome the foregoing and related disadvantages. A further object is to produce a housed battery which provides for gas release without liquid release. A still further object is to produce an alkaline-mercuric-oxide cell which permits hydrogen evolution without electrolyte or mercury leakage. Additional objects will become apparent from the following description and claims.

These objects are attained in accordance with the present invention wherein there is produced an electric battery having a first electrode engaging an electrolyte which defines a surface for contacting an oppositely polarized electrode at which surface gas is generated by battery action: a supporting surface encircling said electrode contacting surface, an electrode structure including a second electrode, and a resilient device urging said latter electrode into electrolytic contact with said electrolyte surface and urging said electrode structure into sealing engagement with said supporting surface for relieving internal pressure within said battery by providing automatic relief valve action between said electrode structure and said supporting surface.

In a more limited embodiment there is produced in accordance with this invention an electrical battery housing comprising two opposed cylindrical metal cups enclosed in a tubular metal case, one of said cups being insulated and separated from said case by means of an intermediate cylindrical insulating grommet provided with an inner lip which separates said cups, the other of said cups containing a consolidated depolarizer material and being in sliding metal contact with said case, resilient means between said case and the bottom of said other cup holding said other cup against the lip of said grommet under a pressure sufficient to normally bring said other cup into engagement with the lip and said lip into engagement with said consolidated depolarizer material, but insufficient to prevent release of internally developed gas under pressure. In another form of the invention the cup in sliding contact with the outer sleeve may be eccentric and/or provided with ribbing or milling on its external cylindrical surface. The resilient spacing material disclosed may be natural or synthetic resins such as elastomers or metal springs, etc.

The invention will be further described with reference to the appended drawings wherein Figure 1 is a cross-sectional view of a cell embodying features of the invention, Figure 1a shows a partial cross-section view of the primary cell shown in Figure 1 illustrating the novel function of the cell, Figure 1b shows in perspective a different form of an electrode cup that can be used in the construction of Figure 1, Figures 1c and 1d are horizontal sectional views along AA of Figure 1 showing alternative electrode cups for use in the batteries of the invention, Figure 1e illustrates in top view a modified resilient member for use in constructions of the invention, Figure 1f illustrates a cross-sectional view of the modified resilient member shown in 1e.

Figures 2, 3 and 4 illustrate a modified cell structure, and

Figure 2a shows a modification of the cell shown in Figure 2.

Figure 1B:
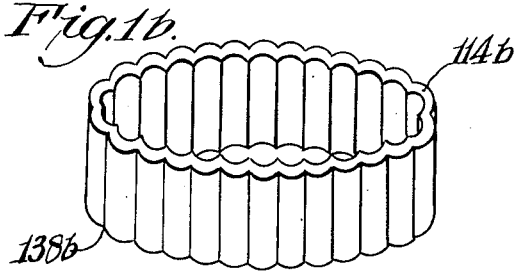

The drawings have been exaggerated where necessary in order to more clearly illustrate the invention.

In accordance with the standard nomenclature of the battery art, the term anode as used herein refers to the electrode of the cell which develops a negative electric potential with respect to the cooperating electrode, and the term cathode refers to the electrode that becomes positively charged relatively to the other electrode.

In Figure 1, an anode 108, such as, for example, a perforated zinc foil, is held in an inverted top cup 102 which may be made of copper or bronze. The cathode or depolarizer 112 is contained, generally in the form of a consolidated pellet of mercuric oxide and graphite, in a bottom cup 114, which may, for example, be cylindrical and made of steel. Disposed around the anode 108 and between the anode and the depolarizer 112, is electrolyte 110, which, for example, may consist of a gelled aqueous solution of KOH and carboxymethyl cellulose or of KOH and polyvinyl alcohol. Anode cup 102 is substantially enclosed by an insulating and sealing sleeve 106, one end of which, as shown at 126, is turned in under the edge of cup 102 to separate this cup from cup 114. The top and bottom cups 102 and 114 and sleeve 106 are housed in an outer container 104, of cold rolled steel, for example. Cathode cup 114 is fitted within the container 104 in such a manner as to provide a piston type slide fit. Space, such as 138, due for example to irregularities in cup 114, provide for the escape of any excess gas from between the cups. The bottom of the container is perforated at 122 to vent the escaping gases. Resilient elements shown as resilient fibrous sheets 116, 120 with an intermediate sheet of perforated lead foil 118, are inserted between the bottom of cathode cup 114 and the bottom of container 104. The upper cup 102 may be fixedly sealed in place with the sleeve 106, as by spinning or rolling over the upper edge 124 of the container.

In use, the container which contacts cup 114 is one terminal of the battery and the exposed portion of cup 102 is the other terminal. The reduced end of cup 102 provides a convenient internal shoulder against which the anode 108 is positioned and serves to identify this terminal.

The resilient elements hold the cups together so that their current-generating ingredients are brought into electrical engagement and can function properly. Should gas accumulate between the cups it will be trapped in place until its pressure is raised sufficiently to momentarily force out cup 114 against the resilient elements. This releases the gas and the cup is immediately reseated to resume normal battery action. The momentary disturbance is ordinarily not even detectable by the user of a hearing aid equipped with the battery shown in Figure 1.

Figure 1a shows the automatic valve action obtained with this invention should gas form in the cell. When the internal pressure within the cell becomes great enough to overcome the resilient clamping force of the porous papers 116, 120, the cathode cup 114 is displaced away from the flange 126 of sleeve 106 to form an opening through which the internal pressure is relieved. The arrows shown indicate the general direction of gas escape through vent 122. The gas relieving action is only momentary and the cups are immediately reseated by the resilient force applied by paper layers 116, 120.

Figure 1C:
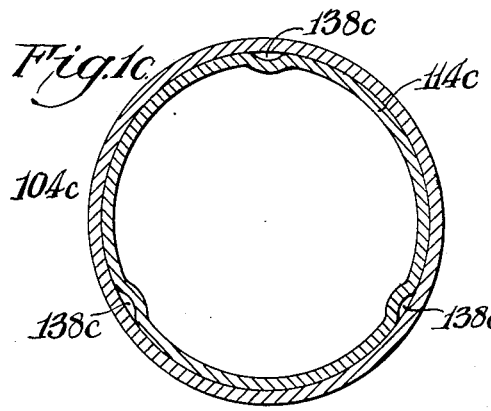
Figure 1D:
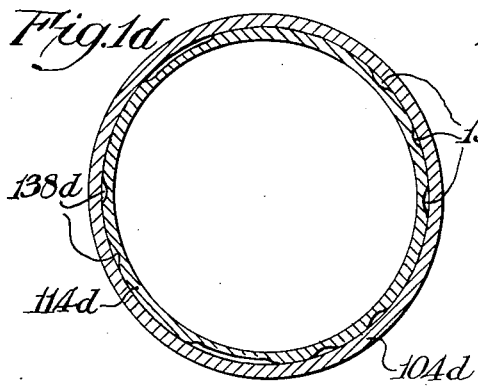

Figures 1b, 1c and 1d show particular forms of modified electrode valve cups that can be used in the construction of Figure 1. Figure 1b shows in perspective a ribbed cathode cup 114b, the indentations 138b between ribs providing a gas releasing passageway. The cups 114c and 114d shown in Figures 1c and 1d function similarly to that shown in Figure 1b. In Figure 1c cup 114c has several indentations 138c therein while in Figure 1d space 138d is due to irregularities in the surface of the walls of outer container 104d and/or cup 114d.

Figure 1E:
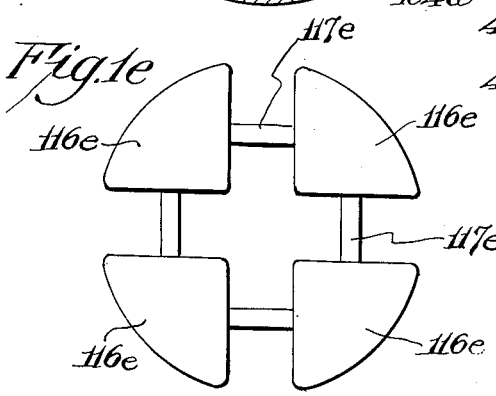

Figure 1e shows a top view of one form of resilient element in accordance with this invention. The element comprises four interconnected rubber sections 116e.

The construction shown in Figure 2 is similar to that shown in Figure 1. Like or similar parts are similarly identified except that each identifying three-digit numeral has the prefix 2 to associate it with Figure 2. (A new prefix will be used for each figure shown herein.) Here, top and bottom cups 202 and 214 are sealed within outer sleeve 204. These cups are resiliently engaged by means of leaf spring 216 as shown. Resilient spring member 216 has spaces 222 therein to provide for the release of internal gas from the cell to the atmosphere. For some purposes a coil spring may be used instead of leaf spring 216.

One of the preferred embodiments of the invention is shown in Figure 2a. The structure shown is similar to Figure 2, except that the consolidated depolarizer 212a acts as the principle support for anode cup 202a and grommet 206a. Grommet 206a preferably consists of a plasticized, tough, synthetic resin film. In the structure shown in Figure 2a consolidated depolarizer material 212a acts both as an integral structural member and as an electrochemical member. This particular structure provides for better electrochemical contact between the depolarizer 212a and the electrolyte and improves the electrical characteristics of the cell.

Figure 3:
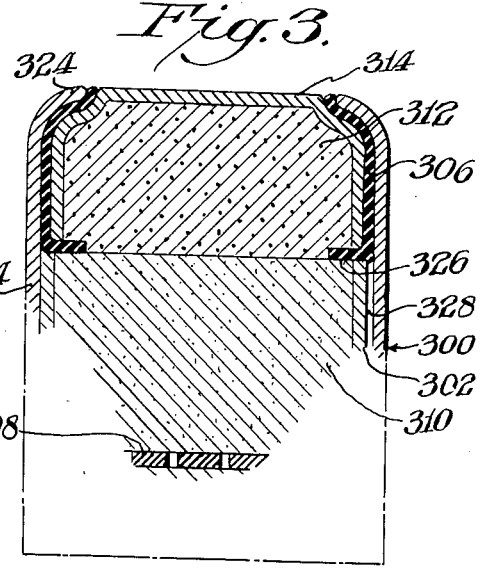

In Figure 3 anode cup 302 is engaged by a resilient member and thereby provides the automatic valve action previously disclosed in detail with reference to Figure 1a. Cathode cup 314 remains in fixed position.

Figure 4:
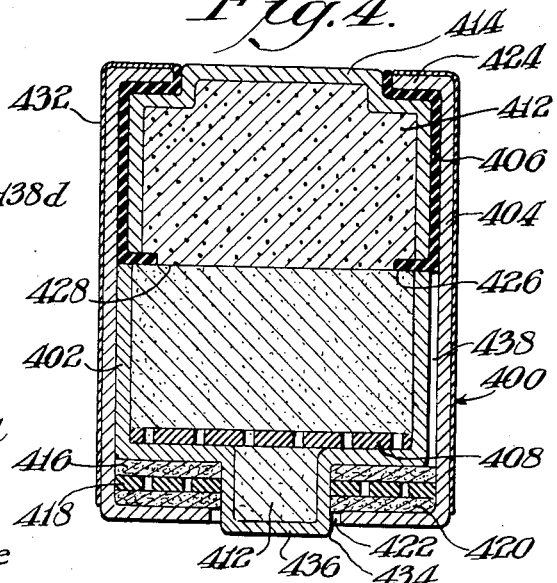
Figure 1F:
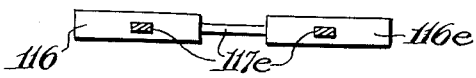

In Figure 4, as in Figure 3, the anode cup 402 is the one engaged by the resilient papers and provides the automatic valve action, while the cathode cup 414 remains stationary. In this modification outer container 404 has an annular shaped opening 422 in its bottom. The dome 436 of anode cup 402 extends through annular opening 434. The opening 422 between the edges of container 404 and the dome 436 of anode cup 402 forms the permanent relief vent. Resilient means comprising porous paper sheets 416, 420 and readily amalgamable metal foils 418 are annular in shape and are juxtaposed between anode cup 402 and outer container 404. The entire unit is held in position by outer container 404 which may be partially enclosed by an insulating jacket, such as, for example, paper jacket 432. The unit is sealed by crimping the shoulder of container 404 as shown at 424. Dome 436 of anode cup 402 provides this modification of the cell with the usual button-type anode construction as shown in Figure 1, for example, thus reducing the possibility that the cell having the inverted electrodes of Figure 3, for example, will be connected in a circuit with the cell polarity inverted.

Dipped or plated coatings of mercury or readily amalgamable metals on the outer walls of the movable electrode cup can be used to trap liquid mercury that may escape from between the cups. When the problem of escaping mercury is not serious, mercury trapping means need not be employed in the cell construction.

Many features of the herein disclosed invention are unique in the art. The electrical battery housing disclosed provides for relative movement of the cell electrode members incident to the development of gas pressure within the cell. This movement does not destroy the cell, in fact, it prolongs its useful life.

The cell is constructed so as to provide continuous sliding electrical contact between the cell housing and at least one of the cell electrode cups. Though, the entire peripheries of the sliding electrode cup and the cell housing are not in continuous physical contact due to irregularities or milling in one of the other, they are in continuous electrical contact. The space between the electrode and the housing provides for the escape of gas from within the cell. Resilient members hold the electrode members against a sealing grommet during normal operation of the cell ultimately permitting gas release at a certain cell pressure and then resealing the cell after this pressure has been safely reduced. The entire action is simple and automatic. The structure is such as to keep the cell stack dimensions at a minimum; it also permits fixed external electrical connections.

While this invention has been described with particular reference to mercury oxide cells, it is not to be limited thereto. The structure may also be used in conjunction with other primary and secondary cells wherein gases are generated within the cell during shelf life and/or under normal operating conditions.

As many apparently widely different embodiments of this invention may be made without departing from the spirit and scope hereof, it is to be understood that the invention is not limited to the specific embodiments hereof except as defined in the appended claims.

What is claimed is:

1. In an electric battery having a first electrode engaging an electrolyte which defines a surface for contacting an oppositely polarized electrode at which surface gas is generated by battery action: a supporting surface encircling said electrode contacting surface, an electrode structure including a second electrode, and a resilient device urging said latter electrode into electrolytic contact with said electrolyte surface and urging said electrode structure into sealing engagement with said supporting surface for relieving internal pressure within said battery by providing automatic relief valve action between said electrode structure and said supporting surface.

2. An electrical battery housing comprising two opposed cylindrical metal cups enclosed in a tubular metal case, one of said cups being insulated and separated from said case by means of an intermediate cylindrical insulating grommet provided with an inner lip which separates said cups, the other of said cups being in sliding metal contact with said case, resilient means between said case and the bottom of said other cup holding said other cup against the lip of said grommet under a pressure sufficient to normally bring said other cup into engagement with the lip, but insufficient to prevent release of internally developed gas under pressure, means defining an opening in said case for the escape of gas released into said case from said cups.

3. The battery of claim 2 wherein the cup in metal contact with said case is substantially filled with solid battery material upon which said inner grommet lip rests.

4. The battery of claim 2 wherein the insulated cup is provided with anode material and the freeboard therein is filled with electrolyte material.

5. The battery as defined by claim 2 wherein the cup in sliding contact with said case is provided with ribbing on its extended cylindrical surface.

6. The battery as defined by claim 2 wherein the resilient spacing material is compressible fibrous sheet material.

7. The combination as defined by claim 1 in which the resilient device is a spring.

8. An electrical battery housing comprising two opposed metal cups enclosed in a tubular metal case, one of said cups being insulated from said case and filled with one set of current-generating ingredients, the other of said cups being in sliding metal contact with said case and filled with a set of complementary current-generating materials, resilient elements between said case and said other cup urging said cups toward each other to bring the sets of current-generating materials into contact with each other, said elements being yieldable to cause gas internally developed by said current-generating ingredients to force the cups apart and escape between the case and said other cup.

9. An electrical battery housing comprising two opposed metal cups enclosed in a tubular metal case, one of said cups being insulated from said case, insulating means covering the lip of said cup, the other of said cups being in sliding metal contact with said case, resilient means between said case and said other cup biasing the open end of said other cup against the insulating means on said first cup so as to hold said cups in a valve-like relation to one another, means defining a gas escape opening in said case, and a piece of material capable of readily forming an amalgam positioned within said case between said gas escape opening and the open ends of said cups.

10. An electrical battery housing comprising two opposed metal cups enclosed in a tubular metal case, one of said cups being insulated from said case and filled with one set of current-generating ingredients, the other of said cups being in sliding metal contact with said case and filled with a set of complementary current-generating materials, resilient elements between said case and said other cup urging said cups toward each other to bring the sets of current-generating materials into contact with each other, said elements being yieldable to cause gas internally developed by said current-generating ingredients to force the cups apart and escape between the case and said other cup said case being provided with means defining a gas escape opening opposite said slideable cup.

WALTER W. SCHROEDER.

References Cited in the file of this patent

UNITED STATES PATENTS

| Number | Name | Date |
|---|---|---|
| 2,060,799 | Drummond | Nov. 17, 1936 |
| 2,081,926 | Gyuris | June 1, 1937 |
| 2,422,045 | Ruben | June 10, 1947 |
| 2,482,514 | Ruben | Sept. 20, 1949 |
| 2,487,985 | Ruben | Nov. 15, 1949 |
| 2,499,239 | Williams | Feb. 28, 1950 |
| 2,526,640 | Daniel | Oct. 24, 1950 |
| 2,536,699 | Ruben | Jan. 2, 1951 |

FOREIGN PATENTS

| Number | Country | Date |
|---|---|---|
| 561,820 | Great Britain | June 6, 1944 |